HORIZONTAL SWEEP SYSTEM PROTECTION CIRCUIT

Original Filed Dec. 6, 1967

Inventor
MEL E. BUECHEL
BY Mueller, Aichele & Rauner
ATTYS.

March 24, 1970 M. E. BUECHEL 3,502,941

HORIZONTAL SWEEP SYSTEM PROTECTION CIRCUIT

Original Filed Dec. 6, 1967 2 Sheets-Sheet 2

Inventor
MEL E. BUECHEL

BY Mueller, Aichele & Rauner

ATTYS.

3,502,941
HORIZONTAL SWEEP SYSTEM PROTECTION CIRCUIT

Mel E. Buechel, Chicago, Ill., assignor to Motorola, Inc., Franklin Park, Ill., a corporation of Illinois Continuation of application Ser. No. 688,387, Dec. 6, 1967. This application Nov. 15, 1968, Ser. No. 776,281
Int. Cl. H01j *29/70, 29/76*
U.S. Cl. 315—27 9 Claims

ABSTRACT OF THE DISCLOSURE

The semiconductor device in a horizontal sweep system is subject to become damaged when an arc occurs in the high voltage rectifier. A protection circuit senses the arc to render the semiconductor device temporarily inoperative.

This application is a continuation of patent application Ser. No. 688,387, now abandoned.

Background of the invention

A standard television receiver includes a horizontal sweep system for continuously deflecting the electron beam in a cathode ray tube. If the output device in the system is a transistor, it is saturated during a trace interval for connecting a supply voltage across the horizontal deflection winding to move the beam from left to right across the screen of the cathode ray tube for depicting video information. During a retrace interval, the beam is rapidly returned to the left hand side of the screen in preparation to scan the next line. Flyback pulses generated during the retrace interval are rectified in a rectifier to provide a high voltage for the cathode ray tube. If the rectifier is defective, an arc may occur across its electrodes, and the high voltage stored by the cathode ray tube would be dissipated through the rectifier and into the high voltage transformer. This rings the transformer to create an oscillatory signal of sufficient amplitude to damage the transistor. Since the arc occurs during the trace interval (when the voltage stress across the rectifier is the greatest), a voltage of substantial magnitude is created across the transistor while it is in saturation to cause it to draw current beyond its capabilities.

Summary of the invention

It is, therefore, an object of this invention to provide a protection circuit for the semiconductor device in a horizontal sweep system to render it temporarily inoperative in the presence of a high voltage rectifier arc.

In brief, a horizontal sweep system includes a semiconductor switch coupled to a high voltage transformer and coupled in series with a voltage supply and a horizontal deflection winding. A pulse providing circuit is coupled to the switch device to periodically render the same conductive to connect the deflection winding across the voltage supply and thereby produce a deflection current in the winding and also producing flyback pulses in the transformer. A rectifier device is coupled to the transformer to rectify pulses and provide a high voltage for the cathode ray tube. The rectifier device has electrodes across which an arc may occur for discharging the high voltage into the transformer to create an oscillatory signal which may damage the switch device. The current in the transformer falls within a given range during normal operation of the rectifier device. A sensing device is coupled to the high voltage transformer to provide a control voltage indicative of the current therein. A circuit coupled between the sensing device and the pulse providing circuit disables the pulse providing circuit when the current falls outside the given range.

Detailed description of the preferred embodiments

Figures 1, 4:
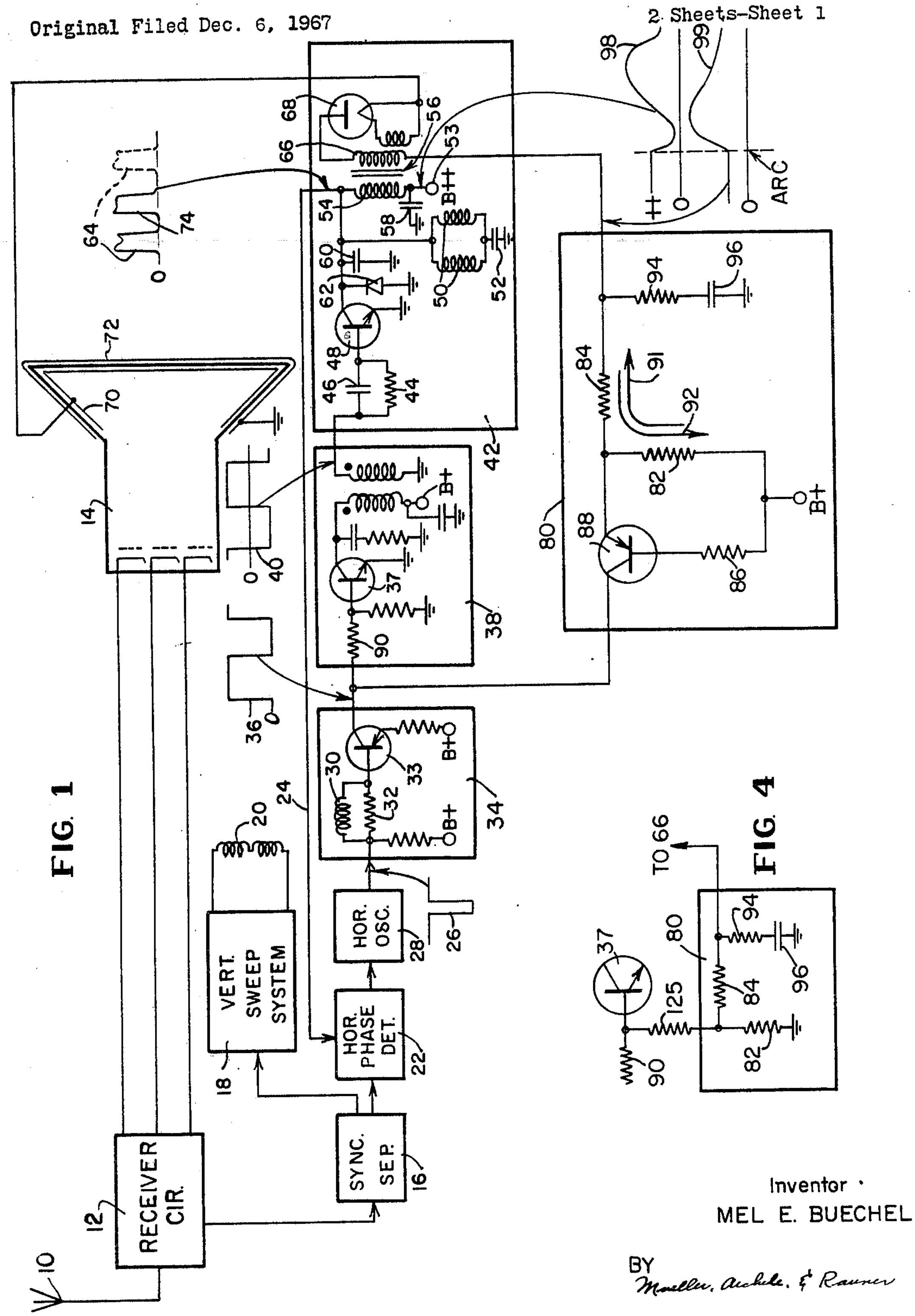
FIG. 1 illustrates a television receiver partially in schematic and partially in block incorporating a protection circuit according to the features of the invention.
FIGS. 2, 3 and 4 illustrate other embodiments of the invention.

Referring now to the television receiver of FIG. 1, a television signal is received by antenna 10 and processed in a known manner by receiver circuit 12 to provide video information for a cathode ray tube 14. Vertical synchronizing pulses are separated from the video information in a synchronizing signal separator circuit 16 and are applied to a vertical sweep system 18. System 18 develops a sawtooth current in the vertical deflection windings 20 on the cathode ray tube 14 for vertically deflecting the electron beams thereof. Horizontal synchronizing pulses are separated from the video information in circuit 16 and are applied to horizontal phase detector 22. Flyback pulses on lead 24 are applied to the horizontal phase detector and are compared with the horizontal synchronizing pulses to develop a DC control voltage to control the frequency of pulses 26 developed by oscillator 28. The pulse durations are lengthened in the parallel combination of inductor 30 and resistor 32 and are amplified by the transistor 33 in a predriver stage 34 to produce the pulses 36. The pulses 36 are amplified by the transistor 37 in a driver stage 38 to provide pulsating signal 40 for horizontal output circuit 42.

Horizontal output circuit 42 includes a resistor 44 and a capacitor 46 connected in parallel and to the base of an NPN transistor 48 to form an RC self-basis network therefor. Horizontal deflection windings 50 disposed on the cathode ray tube 14 are coupled in series with a capacitor 52 between the collector of transistor 48 and ground reference potential. A DC voltage at terminal 53 is bypassed by capacitor 58 and is coupled through the primary winding 54 of a high voltage transformer 56 to the collector of transistor 48. The average voltage across capacitor 52 is equal to the value of the DC voltage at terminal 53. During the trace interval when video information is being depicted on the cathode ray tube 14, the transistor 48 is forward biased by the positive portion of the pulsating signal 40. This acts to connect capacitor 52 across the deflection windings 50 to cause a linearly increasing current to flow through the windings to deflect the electron beams in the cathode ray tube 14 from left to right across its screen. The appearance of the negative portion of pulsating signal 40 renders the transistor 48 non-conductive an energy stored in the deflection windings 50 discharges through a capacitor 60 to rapidly decrease the current through the windings and return the electron beams to the left hand side of the raster. Continued oscillation is prevented by a damper diode 62. When the negative portion of pulsating signal 40 terminates, the forward bias condition is restored on the transistor 48 to commence a new cycle.

Flyback pulses 64 produced during the retrace interval across the primary winding 54 are stepped up to appear across the secondary winding 66 of the transformer 56. The stepped up pulses are rectified by a rectifier 68 to produce a high voltage for the inner conductive coating 70 of the cathode ray tube 14. The outer conductive reference potential. The capacitance formed between coatings 70 and 72 is on the order of 2,000 picofarads and acts to filter the rectified pulses and to maintain the high voltage at a relatively constant value.

An arc between the electrodes of the high voltage rectifier 68 may arise due to a number of reasons. For example, if the rectifier tube is poorly built so that the cathode is too close to the anode, an arc between cathode and anode may occur. Also, if the line voltage which is converted into the supply voltages for the television receiver is high, and the receiver is operated at a high altitude and at a high temperature, the surrounding air is an insufficient insulator and arcing between cathode and anode may occur externally of the rectifier. An arc is manifest as a temporary short circuit in the rectifier, to permit the high voltage stored between the conductive coatings 70 and 72 of the cathode ray tube 14 to discharge through the rectifier 68 and ring secondary winding 66. The arc pulse 74 thereby created appears across the primary winding 54. Since the arc occurs during the trace interval, before or when the transistor 48 is in saturation, the positive peak of the signal 74 will cause an excessive amount of current to flow in the transistor 48 and thereby subject it to damage.

In order to preclude this, a protection circuit 80 is provided. Protection circuit 80 includes a sensing resistor 82 and a resistor 84 coupled in series between a B+ potential and the bottom of the secondary winding 66 of the high voltage transformer 56. The base of a PNP transistor is coupled through a resistor 86 to the B+ potential to provide a fixed voltage on the base. The emitter of the transistor 88 is coupled to the junction of resistors 82 and 84. The collector of transistor 88 is coupled to the base of transistor 37 in the driver stage 34 through a resistor 90.

When the rectifier 68 is functioning normally, current from the B+ potential flows through resistors 82 and 84, through winding 66 and rectifier 68 into the conductive coating 70 of cathode ray tube 14 as indicated by the arrow 91. This produces a voltage on the emitter of transistor 88 negative with respect to the base voltage to maintain transistor 88 non-conductive and produce no effect on transistor 37 in driver stage 38. However, in the presence of an arc, the high voltage stored between conductive coatings 70 and 72 of cathode ray tube 14 discharges through the rectifier 68 and current flows in the reverse direction through winding 66 and resistors 84 and 82 in the direction indicated by arrow 92. This causes the emitter of transistor 88 to be more positive than its base by an amount to saturate the transistor and cause the B+ voltage to be coupled through resistor 82 and the emitter-collector resistance of transistor 88 to the base of the transistor 37 in driver stage 38. The transistor 37 is thereby saturated to ground its collector and preclude the formation of the pulsating signal 40. Without pulsating signal 40, transistor 48 in output circuit 42 cannot be turned on. Even through arc 74 has a high amplitude, the current in transistor 48 is very low to minimize the possibility of damage to it.

Although the arc across the electrodes of rectifier 68 may exist only instantaneously, the oscillatory signal 98 produced thereby may exist for a substantial period of time and in spite of the fact that the amplitude is decreasing, subsequent peaks may be of sufficient amplitude to damage the transistor 48. It is, therefore, desirable that the transistor 48 not be turned on for a selected period of time following the rectifier arc. To accomplish this, a resistor 94 and a capacitor 96 in the protection circuit 80 are coupled in series from resistor 84 to ground reference potential. The current flowing in the direction of arrow 92 charges capacitor 96 with a voltage 99 of a polarity to maintain transistor 88 conductive. After the arc terminates, the charge on capacitor 96 remains to maintain transistor 88 conductive which maintains transistor 37 in stage 38 in saturation and precludes the formulation of pulsating signal 40.

Figure 2:
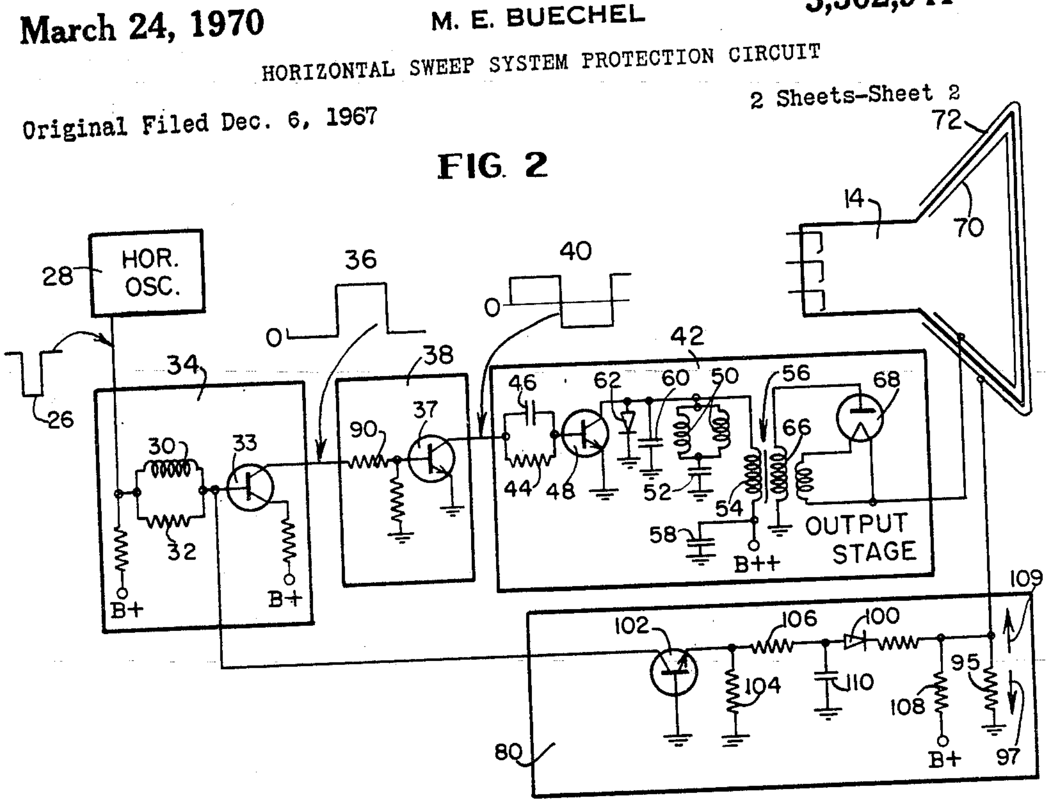

Referring now to FIG. 2 which illustrates another embodiment of the invention wherein components corresponding to those of FIG. 1 are labeled with the same reference numerals. In this embodiment, the bottom of the secondary winding 66 of the flyback transformer 56 is connected to ground reference potential and the outer conductive coating 72 of cathode ray tube 14 instead of being connected directly to ground as shown in FIG. 1, is now connected to ground through a sensing resistor 95. Since resistor 95 is still in series with the conductive coatings 70 and 72, the rectifier 68 and the primary winding 66 as was the case in FIG. 1, normal current flow through resistor 95 is in the direction indicated by arrow 97 and is in the same direction as arrow 91 of FIG. 1. This produces a positive voltage at the "top" of resistor 95 which is used as a control to reverse bias a diode 100. The protection circuit 80 includes an NPN transistor 102 with its base coupled to ground and its emitter coupled to ground through a resistor 104. A resistor 106 couples the emitter to the anode of diode 100. The collector of transistor 102 is coupled to the base of transistor 33 in the predriver stage 34. With the diode 100 reversed bias, transistor 102 is reversed bias so as to have no effect on the transistor 33. A resistor 108 coupled between "top" of resistor 95 and B+ provides additional reverse bias for diode 100 and transistor 102.

In the presence of an arc, the current flow reverses direction as indicated by the arrow 109 to overcome the B+ voltage conducted through resistor 108 and produce a negative control voltage at the junction of resistors 95 and 108. This forward biases diode 100 and places a negative voltage on the emitter of transistor 102 to forward bias it and effectively ground the base of transistor 33 through resistor 104 to in turn saturate transistor 37 in driver stage 38. The rest of the operation is similar to that of FIG. 1, and transistor 48 is maintained non-conductive due to the fact that pulsating signal 40 is not formed. As in FIG. 1, the transistor 48 is maintained disabled for a duration following termination of the arc by a capacitor 110 connected between ground and the junction of resistor 106 and diode 100 to retain the control voltage produced across resistor 95.

Figure 3:
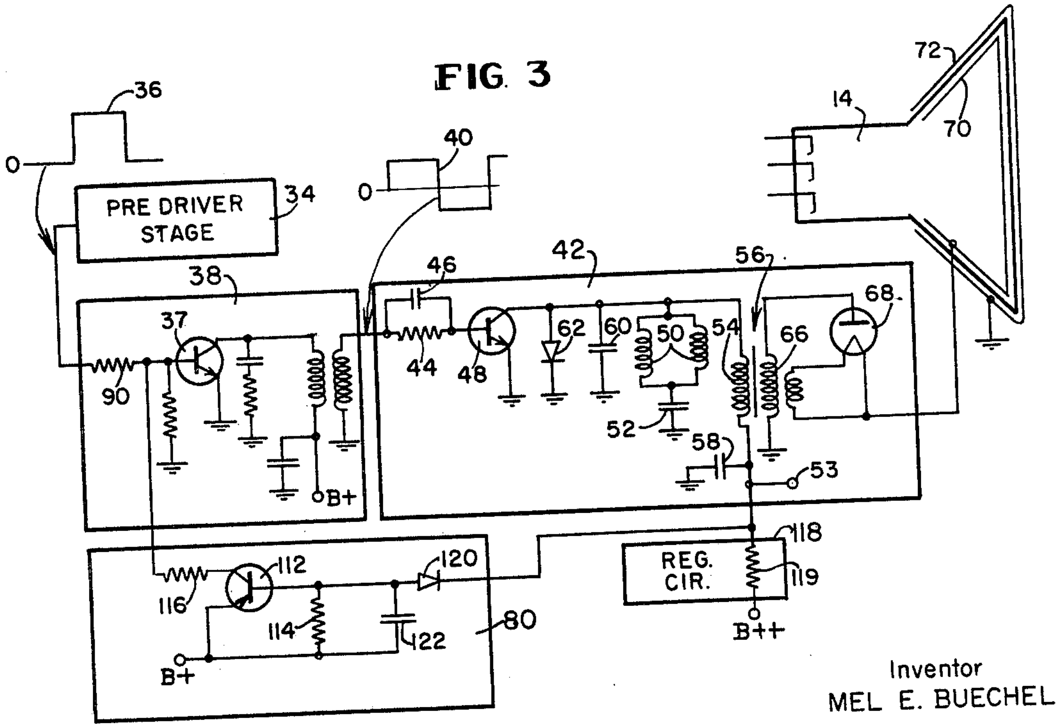

Referring now to FIG. 3, which illustrates another embodiment of the invention and wherein components corresponding to those of FIG. 1 are labeled with the same reference numerals. Protection circuit 80 includes a PNP transistor 112 with its base coupled to B+ through a resistor 114. The emitter of transistor 112 is also coupled to B+ and the collector is coupled to the base of transistor 37 in driver stage 38 through a resistor 116. The DC voltage for horizontal output circuit 42 is coupled through a regulator circuit 118 which has an effective internal series resistance 119. A diode 120 is coupled between terminal 53 and the base of transistor 112. In normal operation, the current drawn by output circuit 42 provides a given voltage drop across resistance 119. This voltage is used as a control to reverse bias diode 120 so that transistor 112 is maintained non-conducting and therefore has no effect on the transistor 37 in driver stage 38.

When an arc occurs in the rectifier 68, the voltage induced across 54 causes the voltage at the collector of 48 to rise and the voltage at terminal 53 to drop thus tending to forward bias diode 120 which in turn forward biases transistor 112. The B+ voltage is coupled through the transistor 112 and the resistor 116 to saturate transistor 37 to preclude formation of pulsating signal 40 as in FIGS. 1 and 2. The driver transistor 48 is maintained disabled for a duration following termination of the arc by utilizing a capacitor 122 charged to the control voltage appearing on terminal 53.

In the circuit of FIG. 4 operation is similar to that of the circuit of FIG. 1 except that the gain of omitted transistor 88 is not realized. When an arc occurs, the potential at the junction of resistors 82 and 84 rises and this rise is coupled throught he resistor 125 to the base of transistor 37. Transistor 37 is thus maintained heavily conductive to keep transistor 48 off until the charge on capacitor 96 has been re-established at its normal DC level for the bias of transistor 37.

In each of the embodiments, means are provided to sense the occurrence of an arc with FIGS. 1 and 2 sensing a change in direction of the high voltage rectifier current and FIG. 3 sensing an excessive load or current in the output circuit 42 arising from the arc. Each of the embodiments disable the pulse supply circuit for the output circuit.

In the past, arcing has been reduced by connecting a resistor in series with the load from the rectifier 68 to the conductive coating 70 of the cathode ray tube 14 to limit the maximum current that may flow in the reverse direction when the capacitance between the conductive coatings 70 and 72 discharge. This, of course, is constantly consuming power even during normal operating conditions. Another method has been to insert a resistor in series with the power supply to the output circuit 42 which is also power consuming. The invention provides improved protection with a higher efficiency by utilizing the protection circuit only when an arc occurs.

I claim:

1. In a horizontal sweep system having a deflection winding for deflecting an electron beam of a cathode ray tube, a voltage supply, a semiconductor switch device coupled in series with the voltage supply and the deflection winding, a high voltage transformer including primary and secondary windings, the semiconductor switch device being coupled to the primary winding, a pulse providing circuit coupled to the switch device for periodically rendering the same conductive to connect the deflection winding across the voltage supply to produce deflection current in the winding and to produce flyback pulses in the transformer, a rectifier device coupled in series with the secondary winding of the transformer for rectifying the pulses to provide high voltage for the cathode ray tube, the rectifier device conducting current in a given direction during normal operation of the rectifier device, and in a reverse direction in the presence of an arc which may occur for discharging the high voltage into the transformer to create an oscillatory signal which may damage the switch device, with the current in the transformer falling in a given range during normal operation of the rectifier device, a protection circuit including in combination: sensing means coupled in series with the rectifier device and the secondary winding for responding to the direction of current therein to provide a control voltage indicative of the current therein, and circuit means coupled between said sensing means and the pulse providing circuit for disabling the pulse providing circuit when the current falls outside the given range.

2. The protection circuit of claim 1 wherein the cathode ray tube has inner and outer conductive coatings across which the high voltage appears, with the inner conductive coating being coupled to the rectifier device, and with said sensing means being coupled between the outer conductive caoting and ground reference potential.

3. The protection circuit of claim 1 wherein said sensing means is coupled between the secondary winding and a referene potential.

4. In a horizontal sweep system having a deflection winding for deflecting an electron beam of a cathode ray tube, a voltage supply, a semiconductor switch device coupled in series with the voltage supply and the deflection winding, a high voltage transformer having primary and secondary windings with the semiconductor switch being coupled in series with the primary winding, a pulse providing circuit coupled to the switch device for periodically rendering the same conductive to connect the deflection winding across the voltage supply to produce a deflection current in the winding and to produce flyback pulses in the transformer, a rectifier device coupled to the secondary winding for rectifying the pulses to provide high voltage for the cathode ray tube, the rectifier device having electrodes across which an arc may occur for discharging the high voltage into the transformer to create an oscillatory signal which may damage the switch device, the switch device conducting an excessive amount of current in the presence of an arc, with the current in the transformer falling within a given range during normal operation of the rectifier device, a protection circuit including in combination: sensing means coupled in series with the switch device and the primary winding to provide a control voltage indicative of the magnitude of current flowing therein, and circuit means coupled between said sensing means and the pulse providing circuit for disabling the pulse providing circuit when the current falls outside the given range.

5. The protection circuit of claim 4 wherein said sensing means is the internal resistance of a regulator circuit coupling a direct current operating potential through the primary winding.

6. In a horizontal sweep system having a deflection winding for deflecting an electron beam of a cathode ray tube, a voltage supply, a semiconductor switch device coupled in series with the voltage supply and the deflection winding, a high voltage transformer coupled to the switch device, a pulse providing circuit coupled to the switch device for periodically rendering the same conductive to connect the deflection winding across the voltage supply to produce a deflection current in the winding and to produce flyback pulses in the transformer, a rectifier device coupled to the transformer for rectifying the pulses to provide high voltage for the cathode ray tube, the rectifier device having electrodes across which an arc may occur for discharging the high voltage into the transformer to create an oscillatory signal which may damage the switch device, with the current in the transformer falling within a given range during normal operation of the rectifier device, a protection circuit including in combination: sensing means coupled to the high voltage transformer to provide a control voltage indicative of the current therein, and circuit means comprising a further semiconductor switch device coupled between the pulse providing circuit and a disabling potential, said sensing means biasing said further switch device into non-conduction when the current in the transformer falls within the given range, and into conduction to couple the disabling potential to the pulse providing circuit when the current falls outside of such range.

7. The protection circuit of claim 6 wherein the pulse producing circuit includes a transistor alternately saturated and unsaturated, and the further switch device is coupled between said disabling potential and the transistor to saturate the same during the presence of an arc.

8. In a horizontal sweep system having a deflection winding for deflecting an electron beam of a cathode ray tube, a voltage supply, a semiconductor switch device coupled in series with the voltage supply and the deflection winding, a high voltage transformer coupled to the switch device, a pulse providing circuit coupled to the switch device for periodically rendering the same conductive to connect the deflection winding across the voltage supply to produce a deflection current in the winding and to produce flyback pulses in the transformer, a rectifier device coupled to the transformer for rectifying the pulses to provide high voltage for the cathode ray tube, the rectifier device having electrodes across which an arc may occur for discharging the high voltage into the transformer to create an oscillatory signal which may damage the switch device, with the current in the transformer falling within a given range during normal operation of the rectifier device, a protection circuit including in combination: first and second resistors connected between ground and the input to the pulse providing circuit, with the first and second resistors being connected together at a junction, a winding of the high voltage transformer being coupled to the junction between the resistors for providing a control voltage indicative of the current flowing therethrough, the pulse providing circuit being disabled when the current falls outside the given range.

9. The protection circuit of claim 8 further including a storage capacitor connected in a circuit between ground and the junction between the first and second resistors for maintaining the pulse providing circuit disabled a predetermined time following termination of the arc.

References Cited

UNITED STATES PATENTS

| | | | |
|---|---|---|---|
| 3,343,061 | 9/1967 | Hetterscheid | 321—2 |
| 3,366,807 | 1/1968 | Heffron | 315—27 X |
| 3,411,032 | 11/1968 | Chi-Sheng Liu | 315—27 |

RICHARD A. FARLEY, Primary Examiner

J. G. BAXTER, Assistant Examiner